United States Patent
Zou et al.

(10) Patent No.: US 7,949,886 B2
(45) Date of Patent: May 24, 2011

(54) POWER SUPPLY SYSTEM FOR MOTHERBOARD

(75) Inventors: Hua Zou, Shenzhen (CN); Feng-Long He, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 458 days.

(21) Appl. No.: 12/121,815

(22) Filed: May 16, 2008

(65) Prior Publication Data
US 2009/0259859 A1    Oct. 15, 2009

(30) Foreign Application Priority Data

Apr. 9, 2008   (CN) .......................... 2008 1 0300933

(51) Int. Cl.
*G06F 1/00*       (2006.01)
*G06F 9/00*       (2006.01)
*H03L 7/00*       (2006.01)

(52) U.S. Cl. .................. 713/300; 713/1; 713/2; 714/36; 714/55; 327/142; 327/143

(58) Field of Classification Search .................. 713/1, 2, 713/300; 714/36, 55; 327/142, 143
See application file for complete search history.

(56) References Cited

U.S. PATENT DOCUMENTS

| | | | | |
|---|---|---|---|---|
| 5,845,136 A * | 12/1998 | Babcock | ........................ | 713/300 |
| 6,253,319 B1 * | 6/2001 | Tran et al. | .......................... | 713/1 |
| 7,003,655 B2 * | 2/2006 | Wang et al. | ....................... | 713/1 |
| 7,069,472 B2 * | 6/2006 | James et al. | .................... | 714/36 |
| 7,353,138 B2 * | 4/2008 | Wang et al. | ..................... | 702/177 |
| 7,747,884 B2 * | 6/2010 | Hu et al. | ........................ | 713/300 |
| 7,765,355 B2 * | 7/2010 | Hu | ................................ | 710/313 |
| 7,779,310 B2 * | 8/2010 | Wei et al. | ......................... | 714/55 |
| 7,839,188 B2 * | 11/2010 | Shi | ................................. | 327/143 |
| 2008/0229087 A1 * | 9/2008 | Li | ...................................... | 713/1 |

OTHER PUBLICATIONS

NXP 4-bit muxed / 1-bit latched I2C-bus EEPROM DIP switch PCA8550, "Jumperless configuration of PC motherboards"—2 pages, dated Aug. 2007.*
"Working with BIOS and CMOS"—5 pdf pages (12 total in document), No Date provided, Retrieved on Jan. 26, 2011.*

* cited by examiner

*Primary Examiner* — Brian T Misiura
(74) *Attorney, Agent, or Firm* — Frank R. Niranjan

(57) ABSTRACT

An exemplary power supply system and method for a motherboard includes a power circuit providing power for a south bridge, and a controller having first and second transistors. An input terminal of the power circuit is connected to a power supply. An output terminal of the power circuit is connected to a reset pin of the south bridge. A first terminal of the first transistor is configured for receiving a control signal from the south bridge. A second terminal of the first transistor is connected to a first terminal of the second transistor. A second terminal of the second transistor is connected to the reset pin of the south bridge. Each of the first and second transistors has a third terminal grounded.

14 Claims, 1 Drawing Sheet

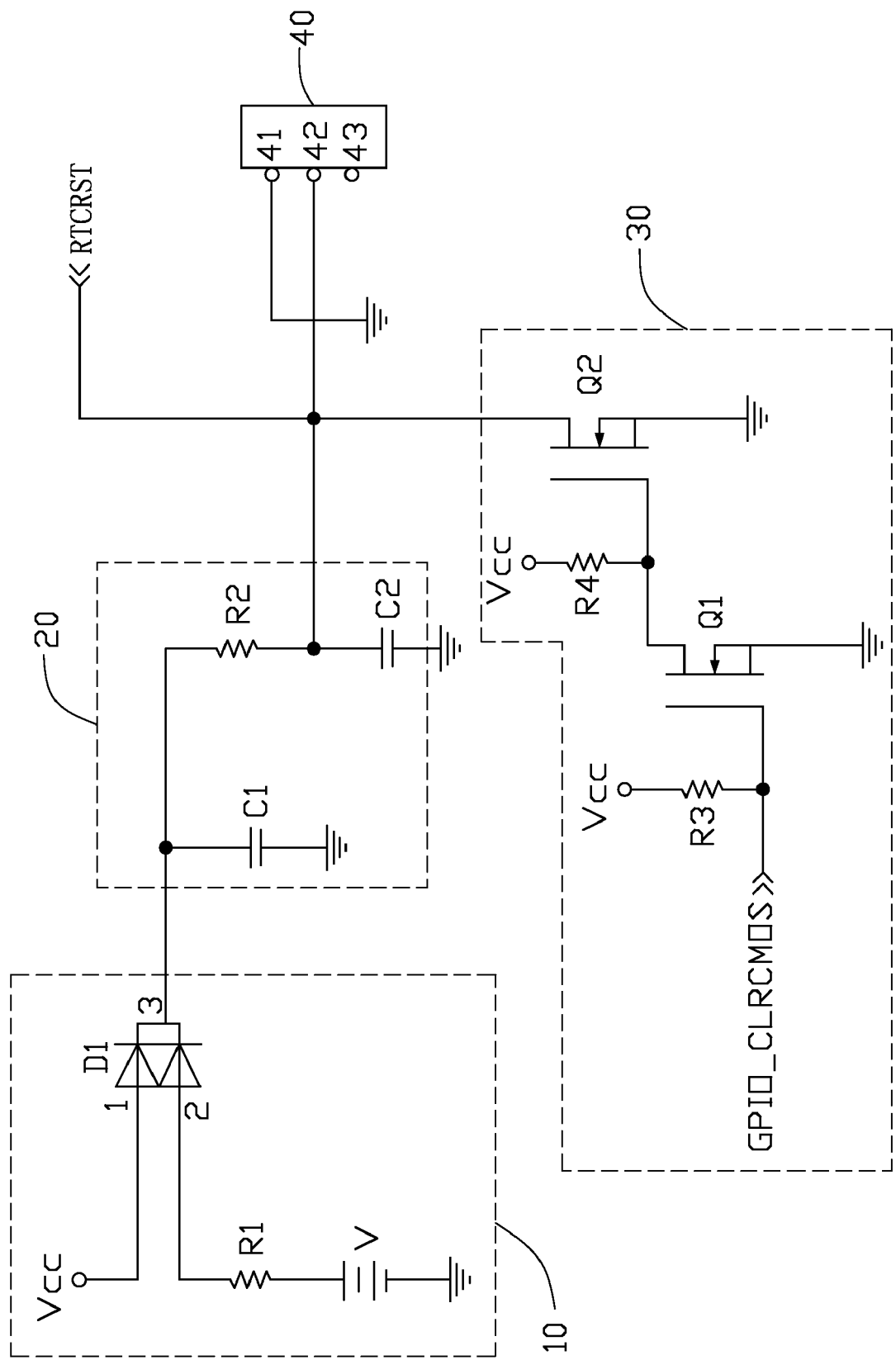

POWER SUPPLY SYSTEM FOR MOTHERBOARD

CROSS-REFERENCES TO RELATED APPLICATION

Relevant subject matter is disclosed in a U.S. Patent Application entitled "POWER SUPPLY CIRCUIT FOR MOTHERBOARD", filed on Dec. 18, 2007 with application Ser. No. 11/958,397, and assigned to the same assignee as this application.

BACKGROUND

1. Field of the Invention

The present invention relates to power supply systems, and particularly to a power supply system for a motherboard in a computer.

2. Description of Related Art

With regards to electronics, and particularly computer electronics, jumpers are typically used to set up or adjust printed circuit boards, such as the motherboards of computers. Jumper pins (points to be connected by the jumper) are arranged in groups called jumper blocks, with each group having at least one pair of contact points and often more. In general, each contact in a jumper block terminates in a small metal pin. An appropriately sized conductive sleeve called a jumper, or more technically, a jumper shunt, is slipped over the pins to complete the circuit.

Jumper blocks and jumpers are often used on a motherboard to maintain power supply to a south bridge thus safeguarding complementary metal oxide semiconductor (CMOS) information stored therein. Further, the jumpers may be moved to invoke a function to clear the CMOS information in the south bridge, and reset the BIOS configuration settings, which allows the computer to boot if a recent BIOS setting made it unable to boot, or if the CMOS boot password was forgotten. However, using the jumper to clear the CMOS information is time-consuming and inefficient because the computer chassis must be taken apart before clearing the CMOS information in the south bridge.

What is needed, therefore, is to provide a power supply system and method for a motherboard which is convenient for computer users to clear CMOS information in a south bridge thereof when the computer fails to boot.

SUMMARY

An exemplary power supply system and method for a motherboard includes a power circuit providing power for a south bridge, and a controller having first and second transistors. An input terminal of the power circuit is connected to a power supply. An output terminal of the power circuit is connected to a reset pin of the south bridge. A first terminal of the first transistor is configured for receiving a control signal from the south bridge. A second terminal of the first transistor is connected to a first terminal of the second transistor. A second terminal of the second transistor is connected to the reset pin of the south bridge. Each of the first and second transistors has a third terminal grounded.

Other advantages and novel features of the present invention will become more apparent from the following detailed description of preferred exemplary embodiment when taken in conjunction with the accompanying drawing, in which:

BRIEF DESCRIPTION OF THE DRAWING

The FIGURE is a circuit diagram of an exemplary embodiment of a power supply system for a motherboard in accordance with the present invention.

DETAILED DESCRIPTION

Referring to the drawing, a power supply system for a motherboard in accordance with an exemplary embodiment of the present invention is configured to supply power to a south bridge of the motherboard. The power supply system includes a power circuit 10, a filter circuit 20, a controller 30, and a jumper device 40 having three pins 41, 42, and 43.

The power circuit 10 includes a Schottky diode D1, a resistor R1, and a direct current (DC) voltage source V. The Schottky diode D1 includes a first anode 1 coupled to a power supply Vcc, a second anode 2 coupled to the anode of the DC voltage source V via the resistor R1, and a cathode 3 coupled to a reset pin RTCRST of the south bridge via the filter circuit 20. The cathode of the DC voltage source V is grounded. The first anode 1 and the cathode 3 of the Schottky diode D1 are respectively input and output terminals of the power circuit 10. The power circuit 10 supplies power to the south bridge via the filter circuit 20.

The filter circuit 20 includes capacitors C1, C2, and a resistor R2. One terminal of the capacitor C1 is coupled to the cathode 3 of the Schottky diode D1, the other terminal of the capacitor C1 is grounded. One terminal of the resistor R2 is coupled to the cathode 3 of the Schottky diode D1, and the other terminal of the resistor R2 is grounded via the capacitor C2. A node between the capacitor C2 and the resistor R2 is coupled to the reset pin RTCRST of the south bridge.

The controller 30 includes metallic oxide semiconductor field effect transistors (MOSFET) Q1 and Q2, and resistors R3 and R4. The MOSFETs Q1 and Q2 are N-channel MOSFETs. A first terminal of the MOSFET Q1 is connected to a pin GPIO_CLRCMOS of a general purpose input/output port of the south bridge. A second terminal of the MOSFET Q1 is connected to a first terminal of the MOSFET Q2. A second terminal of the MOSFET Q2 is connected to the reset pin RTCRST of the south bridge. First terminals of the MOSFET Q1 and Q2 are connected to the power supply Vcc via the resistors R3 and R4 respectively. Each of the MOSFETs Q1 and Q2 has a third terminal grounded. The first, second, and third terminals of the MOSFETs are respectively the gate, the drain, and the source.

The pin 41 of the jumper device 40 is grounded, the pin 42 of the jumper device 40 is connected to the reset pin RTCRST of the south bridge, and the pin 43 of the jumper device 40 is idle.

When the motherboard is functioning normally, the power supply Vcc supplies power to the south bridge via the Schottky diode D1 and the filter circuit 20. If the power supply Vcc is cut off, the DC voltage source V supplies power to the south bridge via the Schottky diode D1 and the filter circuit 20. The filter circuit 20 is configured for wave filtering and eliminating or reducing the influence of noise signals.

When the motherboard is functioning normally, the pins 42 and 43 are connected together via a jumper (not shown), the pin GPIO_CLRCMOS is at a high-impedance state, the MOSFET Q1 is turned on, the MOSFET Q2 is turned off, and the drain of the MOSFET Q2 outputs a high level signal. When a user wants to clear the CMOS information in the south bridge, the jumper can be moved to engage with the pins 41 and 42 of the jumper device 40, thereby lowering the level of the pin 42. The voltage at the pin GPIO_CLRCMOS can be reset to a low level in the BIOS, then the MOSFET Q1 is turned off, the MOSFET Q2 is turned on, and the drain of the MOSFET Q2 outputs a low level signal, to ultimately clear the CMOS information in the south bridge. Keyboard hotkeys can be further used to drive the BIOS to reset the voltage level of the pin GPIO_CLRCMOS.

The power supply system allows computer users to conveniently clear the CMOS information in the south bridge by selectively using the jumper and the keyboard hotkeys.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A power supply system for a motherboard, comprising:
    a power circuit configured for providing power for a south bridge of the motherboard, an input terminal of the power circuit is connected to a power supply, and an output terminal of the power circuit is connected to a reset pin of the south bridge; and
    a controller comprising first and second transistors, a first terminal of the first transistor is configured for receiving a control signal from the south bridge, a second terminal of the first transistor is connected to a first terminal of the second transistor, a second terminal of the second transistor is connected to the reset pin of the south bridge, each of the first and second transistors has a third terminal grounded;
    when the motherboard is functioning normally, the control signal is at a first logic level, the second terminal of the second transistor is at a high voltage level; when clearing complementary metal oxide semiconductor (CMOS) information in the south bridge, the control signal is at a second logic level, the second terminal of the second transistor and the reset pin of the south bridge are at a low voltage level, to clear the CMOS information.

2. The power supply system as claimed in claim 1, wherein the power circuit comprises a first resistor, a direct current voltage source, and a Schottky diode, the Schottky diode comprises a first anode functioned as the input terminal of the power circuit, a second anode coupled to the anode of the direct current voltage source via the first resistor, and a cathode that functions as the output terminal of the power circuit, the cathode of the direct current voltage source is grounded.

3. The power supply system for the motherboard as claimed in claim 2, further comprising a filter circuit coupled between the cathode of the Schottky diode and the south bridge, the filter circuit comprising a first capacitor, a second capacitor, and a second resistor, one terminal of the first capacitor is coupled to the cathode of the Schottky diode, the other terminal of the first capacitor is grounded, one terminal of the second resistor is coupled to the cathode of the Schottky diode, the other terminal of the second resistor is grounded via the second capacitor, and a node between the second resistor and the second capacitor is coupled to the reset pin of the south bridge.

4. The power supply system as claimed in claim 3, further comprising a jumper device, the jumper device comprising a first pin grounded, a second pin coupled to the node between the second resistor and the second capacitor, and a third pin idle, when the power supply circuit works normally, the second pin and the third pin are connected together, when clearing the CMOS information in south bridge, the first pin and the second pin are connected together.

5. The power supply system as claimed in claim 1, wherein the control signal is sent from a pin of a general purpose input/output port of the south bridge.

6. The power supply system as claimed in claim 1, wherein the first and second transistors are N-channel metallic oxide semiconductor field effect transistors, the first, second, and third terminals of each of the first and the second transistors are the gate, the drain, and the source respectively.

7. The power supply system as claimed in claim 1, wherein the first and second transistors are negative-positive-negative transistors, the first, second, and third terminals of each of the first and the second transistors are the base, the collector, and the emitter respectively.

8. A method for providing power to a motherboard, the method comprising of: providing:
    a power supply,
    a power circuit configured for providing power for a south bridge of the motherboard;
    a controller comprising first and second transistors;
    configuring the power circuit with an input terminal connected to the power supply, and an output terminal connected to a reset pin of the south bridge; and
    configuring the first transistor to have a first terminal that receives a control signal from the south bridge, and a second terminal connected to a first terminal of the second transistor, a second terminal of the second transistor is connected to the reset pin of the south bridge, each of the first and second transistors has a third terminal grounded;
    wherein, when the motherboard is functioning normally, the control signal is at a first logic level and the second terminal of the second transistor is at a high voltage level; when clearing complementary metal oxide semiconductor (CMOS) information in the south bridge, the control signal is at a second logic level, the second terminal of the second transistor and the reset pin of the south bridge are at a low voltage level, to clear the CMOS information.

9. The method for providing power to the motherboard as claimed in claim 8, wherein the power circuit comprises a first resistor, a direct current voltage source, and a Schottky diode; the Schottky diode comprises a first anode functioned as the input terminal of the power circuit, a second anode coupled to the anode of the direct current voltage source via the first resistor, and a cathode that functions as the output terminal of the power circuit, the cathode of the direct current voltage source is grounded; when the motherboard is functioning normally, the power supply supplies power to the south bridge via the Schottky diode; on the condition that the power supply is cut off, the direct current voltage source supplies power to the south bridge via the first resistor and the Schottky diode.

10. The method for providing power to the motherboard as claimed in claim 9, further comprising of:
    providing a filter circuit that filters wave and reduces the influence of noise signals,
        wherein the filter circuit is coupled between the cathode of the Schottky diode and the south bridge,
        the filter circuit comprises a first capacitor, a second capacitor, and a second resistor; one terminal of the first capacitor is coupled to the cathode of the Schottky diode, the other terminal of the first capacitor is grounded; one terminal of the second resistor is coupled to the cathode of the Schottky diode, the other terminal of the second resistor is grounded via the second capacitor; and a node between the second resistor and the second capacitor is coupled to the reset pin of the south bridge.

11. The method for providing power to the motherboard as claimed in claim 8, further comprising:

providing a jumper device, wherein the jumper device comprises a first pin that is grounded, a second pin coupled to the node between the second resistor and the second capacitor, and a third pin that is idle: when the power supply circuit is in a normal condition, the second pin and the third pin are connected together; when clearing the CMOS information in south bridge, the first pin and the second pin are connected together.

12. The method for providing power to the motherboard as claimed in claim 8, wherein the control signal is sent from a pin of a general purpose input/output port of the south bridge.

13. The method for providing power to the motherboard as claimed in claim 8, wherein the first and second transistors are N-channel metallic oxide semiconductor field effect transistors, the first, second, and third terminals of each of the first and the second transistors are the gate, the drain, and the source respectively.

14. The power supply method as claimed in claim 8, wherein the first and second transistors are negative-positive-negative transistors, the first, second, and third terminals of each of the first and the second transistors are the base, the collector, and the emitter respectively.

* * * * *